United States Patent
Frank et al.

(10) Patent No.: US 9,467,024 B2
(45) Date of Patent: Oct. 11, 2016

(54) SUPER CONDUCTING SYNCHRONOUS MACHINE COMPRISING A ROTOR WHICH CAN ROTATE IN RELATION TO A STATOR AND WHICH HAS AT LEAST ONE SUPER CONDUCTING WINDING

(75) Inventors: Michael Frank, Uttenreuth (DE); Peter Van Hasselt, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 245 days.

(21) Appl. No.: 14/002,377

(22) PCT Filed: Feb. 22, 2012

(86) PCT No.: PCT/EP2012/053007
§ 371 (c)(1),
(2), (4) Date: Aug. 30, 2013

(87) PCT Pub. No.: WO2012/119858
PCT Pub. Date: Sep. 13, 2012

(65) Prior Publication Data
US 2013/0334913 A1    Dec. 19, 2013

(30) Foreign Application Priority Data
Mar. 4, 2011 (DE) .................. 10 2011 005 091

(51) Int. Cl.
*H02K 9/20* (2006.01)
*H02K 55/04* (2006.01)

(52) U.S. Cl.
CPC ............... *H02K 9/20* (2013.01); *H02K 55/04* (2013.01); *Y02E 40/625* (2013.01)

(58) Field of Classification Search
CPC .......... H02K 1/32; H02K 55/04; H02K 9/20; Y02E 40/625
USPC ............ 310/61, 57, 58, 59, 60 A, 64, 54, 55
See application file for complete search history.

(56) References Cited

U.S. PATENT DOCUMENTS

| | | | |
|---|---|---|---|
| 6,657,333 B2 * | 12/2003 | Shoykhet | H02K 55/04 310/60 A |
| 2003/0052555 A1 | 3/2003 | Driscoll | |
| 2003/0080636 A1 * | 5/2003 | Boardman | H02K 9/18 310/58 |

FOREIGN PATENT DOCUMENTS

| | | | | |
|---|---|---|---|---|
| JP | S5423912 A | | 2/1979 | |
| JP | 5728540 A | | 2/1982 | |
| JP | S5728540 | * | 2/1982 | H02K 55/04 |

(Continued)

OTHER PUBLICATIONS

English abstract corresponding to document (N); JPS5728540; Japan; Feb. 1982; Mizumoto Muneo.*

*Primary Examiner* — Terrance Kenerly
*Assistant Examiner* — Ahmed Elnakib

(57) ABSTRACT

A super conducting synchronous machine including a rotor which may rotate in relation to a stator and which has at least one super-conducting winding which is cooled by means of a cooling machine is provided. The cooled areas of the rotor are surrounded at least partially by a vacuum chamber rotating with the rotor. A pump line connecting the vacuum chamber to a vacuum pump is provided in a connection area produced by means of at least two rotational seals, fixed in relation to a rotor and defining the vacuum chamber.

4 Claims, 4 Drawing Sheets

(56) References Cited

FOREIGN PATENT DOCUMENTS

| JP | 5910153 A | 1/1984 |
| JP | 60176462 A | 9/1985 |
| JP | S60210160 A | 10/1985 |
| JP | 61094558 A | 5/1986 |
| JP | S6198155 A | 5/1986 |
| JP | 2003204643 A | 7/2003 |

* cited by examiner

SUPER CONDUCTING SYNCHRONOUS MACHINE COMPRISING A ROTOR WHICH CAN ROTATE IN RELATION TO A STATOR AND WHICH HAS AT LEAST ONE SUPER CONDUCTING WINDING

CROSS REFERENCE TO RELATED APPLICATIONS

This application is the US National Stage of International Application No. PCT/EP2012/053007 filed Feb. 22, 2012 and claims benefit thereof, the entire content of which is hereby incorporated herein by reference. The International Application claims priority to the German application No. 102011005091.4 DE filed Mar. 4, 2011, the entire contents of which is hereby incorporated herein by reference.

FIELD OF INVENTION

The invention relates to a superconducting synchronous machine comprising a rotor which can rotate in relation to the stator and which has at least one superconducting winding, which is cooled by means of a cooling device, wherein the cooled areas of the rotor are at least partly surrounded by a vacuum chamber rotating with the rotor.

BACKGROUND OF INVENTION

Superconducting synchronous machines, i.e. synchronous machines having at least one superconducting winding, are already basically known in the prior art. In such cases the superconducting winding can be a rotor winding which must be cooled by a cooling device in order to maintain the operating temperature. For example it is known that the rotor can be provided with a hollow inner space in which a cooling medium introduced into this inner space evaporates on a heat-conducting winding carrier in order to cool the windings. The inner space thus acts as an evaporator space.

In order to insulate the cooled areas of the rotor, the "cold part" is usually surrounded by an insulating vacuum, meaning that a vacuum chamber rotating with the rotor is provided as part of the rotor. In such cases it has been proposed that the later vacuum chamber be pumped out and sealed off during the installation of the rotor in order to generate a static vacuum.

In practice however an absolute static vacuum is very difficult to achieve. As a result of leakage rates in the area of the flanged connections, welded joints and partly in the components used themselves it must be assumed that gases from the outer space will be able to intrude into the vacuum chamber to a greater or lesser extent during the operating life of the synchronous machine.

A number of approaches for improvement are known here in the prior art. On the one hand it has been proposed that by using so-called cryopumps, gases entering the chamber are frozen out and the vacuum thus maintained. With sufficiently small leakages this method is very successful and guarantees the operation of the machine even over longer periods. If however the cryopumps are heated together with the synchronous machine, the frozen-out gas also evaporates again and destroys the insulating vacuum. Further cooling down is then only possible with re-evacuation of the built-in rotor. For gases which cannot be frozen out at the operating temperature of the cold part of the rotor, for example hydrogen, helium or neon, other methods must be pursued.

For hydrogen the use of so-called getter materials has been proposed, which bind the gases by adsorption, absorption or chemically.

It has further been proposed that the use of a static vacuum be dispensed with and that there be permanent pumping at the rotating vacuum chamber in that a pump flanged onto the rotor rotates along with the rotor. However, at high speeds in particular, this solution is ultimately not able to be implemented, since the centrifugal forces acting on the pump become too great with existing pump designs.

SUMMARY OF INVENTION

The underlying object of the invention is to design a synchronous machine such that an insulation vacuum present in a vacuum chamber of the rotor can be reliably maintained.

To achieve this object, with a synchronous machine of the type described above, there is provision in accordance with the invention for a pump line connecting the vacuum chamber to a vacuum pump to be provided in a connecting area generated by at least two rotary seals static relative to the rotor and delimiting the vacuum chamber.

In accordance with the invention it is therefore proposed that rotary seals be used, wherein especially preferably ferrofluid seals are used, to implement a static connection area as a part of the vacuum chamber, so that a static gas tube, the pump line, can be connected there for example. Thus a static connection to an existing pump is created which thus does not have to rotate with the rotor itself.

There is thus still provision for the rotating vacuum chamber to be separated from the outside and the rest of the rotor, especially a cooling medium chamber present in the rotor, by flanged connections and cryostat walls for example. However a separation from the outside is also provided by a rotary seal, wherein two rotary seals surrounding the connection area are used. In this way the vacuum chamber is still sealed, however it is made possible to connect the rotating vacuum chamber via a static pump line.

The vacuum chamber of the rotating insulation vacuum previously separated for example by cryostat walls and flanged connections from the other spaces is thus topologically modified such that it has a static delimitation not rotating with the rotor in which a pump line to a fixed-location pump can be accommodated. In this way it is thus possible to operate the pump even during operation and thus to ensure that the vacuum is maintained. In this case there can be provision for the vacuum pump to be both continually operated but it is also conceivable to provide a controlled operation at intervals, if suitable sealing is provided for example.

The inventive use of explicitly-employed rotary seals will thus create for the first time a reliable concept for simple evacuation of the vacuum chamber and one which is possible at any time.

In a concrete embodiment of the present invention there can be provision for a static line section for a cooling medium to be routed into the rotor as a part of the cooling device, which static line section is surrounded by a component having a cylindrical external wall, especially a cooling trunk, wherein the axially consecutive rotary seals are disposed such that a part of the static external wall and/or a static portion of a unit comprising the two rotary seals forms a delimitation of the vacuum chamber. Cooling devices which supply a cooling medium to be used from a static part of the cooling device into the rotor are already basically known in the prior art. For example embodiments are conceivable in which a cooling device using an inner space of the rotor as evaporator chamber is provided. Then the line section can for example protrude as a tube into this inner space, so that liquid cooling medium drops from it onto the walling of the inner space formed for example by the winding carrier. With an embodiment of this type or a similar embodiment it is now usual to use a rotary passage/rotary seal in any event to connect the static component comprising the line section into the rotor. In accordance with the invention there can now be provision in this first embodiment for supplementing the rotary seal present in any event by a further rotary seal which makes it possible to connect the vacuum chamber to a static pump line piece. For example it is thus conceivable for the rotary seal positioned towards the rotor to seal the vacuum chamber from the inner space of the rotor used for example as the cooling medium space, while simultaneously, through the rotary seal pointing away from the central point of the rotor, the vacuum chamber is sealed from the outer space. In this case two options are now conceivable.

On the one hand the external wall of the component, especially of the cooling trunk, can itself form a delimitation of the vacuum chamber, to which the pump line connects as an opening or as a type of support. In this case it is thus possible for the pump line to be routed through the component, for example the component can have a separate vacuum area which is assigned to the line section adjacent to the external wall, through which the pump line can be routed.

In accordance with the invention however it is preferred for the pump line to be routed through a rotary seal. Thus, if the rotary seal thus consists of two hollow cylinders able to be rotated against one another, wherein the gap between the hollow cylinders is sealed accordingly, for example by a ferrofluid, the pump line can for example be routed through the static hollow cylinder. Then only a modification of the rotary seal is thus required.

It is especially expedient for the two rotary seals to be implemented as a single constructional unit. For example a hollow cylinder, which forms the static part of both rotary seals, can lie opposite two further hollow cylinders which, spaced apart from one another, form the two rotary seals. The portion of the constructional unit spanning the two rotary seals then ultimately forms a delimitation of the vacuum chamber, thus the connecting area. It is then especially preferred for the outlet line to be routed through the constructional unit. That means that the rotary passages/rotary seals are then combined in a common constructional unit with integrated pump line, so that the pump line can be routed for example through the static hollow cylinder encompassing both rotary seals, thus in part also through a rotary seal.

In an alternate embodiment of the present invention there can be provision for the rotary seals to be disposed on an external wall of the rotor, on one side of an opening expanding the vacuum chamber into the connection area in each case. Such an embodiment is especially possible if the cylindrical external wall or a cylindrical external wall of the rotor is also continued outside the stator, where rotary seals of large diameter can then be used, which are each adjacent to an opening of the vacuum chamber surrounding them in the axial direction. In this case the opening can be embodied at least partly radially circumferential, it is however also advantageously conceivable to provide at least one, especially a number of openings distributed around the outer circumference of the rotor. Since the static pump line only engages at one point along the circumference of the rotor, the conditions are created by openings essentially covering the entire circumference or by one circumferential opening for effectively maintaining the vacuum at all times with the vacuum pump by pumping the vacuum.

The present invention can be used especially advantageously if the rotor is surrounded by a hydrogen gas provided for cooling the stator. This can be the case with large generators for example. The hydrogen gas required for stator cooling results in an especially critical situation for the vacuum chamber of the rotor since an increased external pressure is produced (a few bar), the hydrogen is highly diffuse and the boiling point of the hydrogen is very low. Since long operating times are demanded with such large generators, the inventive the embodiment offers an especially advantageous and expedient option of maintaining the vacuum by continually pumping out intruding hydrogen.

BRIEF DESCRIPTION OF THE DRAWINGS

Further advantages and details of the present invention emerge from the exemplary embodiments described below as well as with reference to the drawings, in which.

DETAILED DESCRIPTION OF INVENTION

Figure 1:
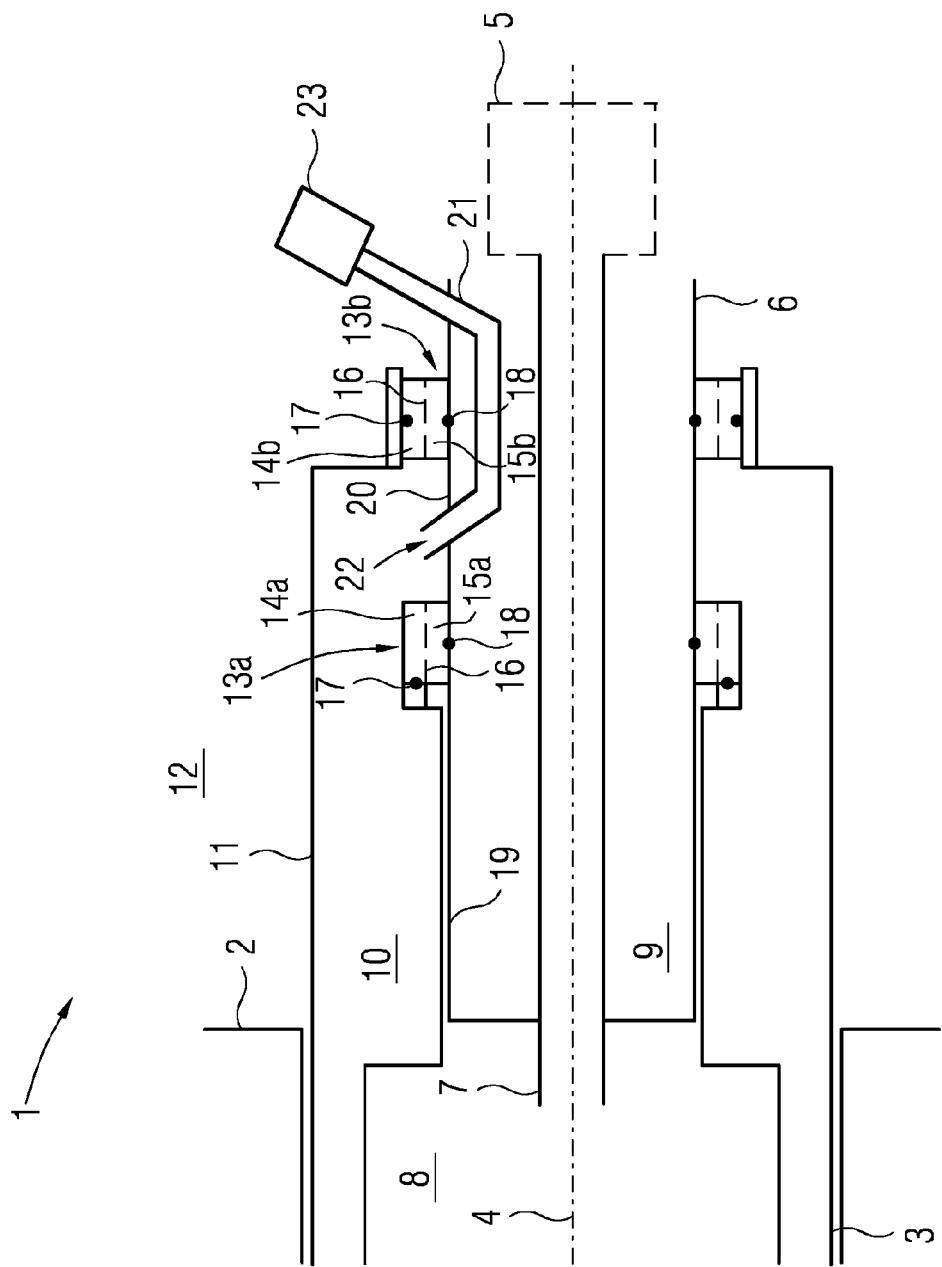
FIG. 1 shows relevant components of an inventive synchronous machine of a first embodiment.

FIG. 1 shows a basic diagram of relevant components and areas of an inventive superconducting synchronous machine 1. It comprises a rotor 3 which can rotate in relation to a stator 2 with stator windings not shown in any greater detail, in which superconducting windings not shown here in any greater detail are provided. The rotor is able to be rotated in this case around an axis of rotation 4.

In order to keep the superconducting windings at their operating temperature, the synchronous machine 1 also has a cooling device indicated by the number 5, which via a line section 7 which is static relative to the rotor 3 integrated into a component 6, conveys a liquid cooling medium into a hollow inner space 8 of the rotor 3, where it evaporates while cooling the windings and is fed via another area of the line section 7 again to a condenser of the cooling device 5. To transport the cooling medium the thermosiphon effect is utilized for example and the inner space 8 acts as an evaporator space.

As an insulating vacuum area 9 is provided for insulating the line section in the component 6, the cooled areas of the rotor 3 are also surrounded by a vacuum chamber 10. The vacuum chamber 10 is separated by cryostat walls 11 and flanged connections from the inner space 8 and the outer space 12, wherein the outer space 12, for cooling the stator 2 for example, particularly the stator windings, can be filled with hydrogen gas.

In order to now make possible a continuous, or with an installed rotor 3, even still possible evacuation of the vacuum chamber 10, this has a topology changed in relation to the prior art. Thus two rotary seals 13a, 13b (often called rotary passthroughs) are provided, which are embodied as ferrofluid seals. They comprise two hollow cylinders 14a, 14b, 15a, 15b rotatable against one another, which are sealed from one another by a ferrofluid 16 only indicated here. The hollow cylinders 14a, 14b, 15a, 15b rotate in this case with the rotor 3 and are connected to the latter via a sealing ring 17. The hollow cylinders 15a, 15b are connected via sealing rings 18 to the component 6, in concrete terms to its external wall 19.

Thus the rotary seal 13a seals the inner space 8 from the vacuum chamber 10 here, while the rotary seal 13b seals the vacuum chamber 10 from the outer space 12. Thus an arrangement is produced in which a section 20 of the external wall 19 of the component 6 forms a delimitation of the vacuum chamber 10, which however does not rotate along with it but is static. This makes it possible for a pump line 21 routed through the component 6, in concrete terms the vacuum area 9, to connect to the vacuum chamber in the connection area 22 formed. The pump line 21 connects the vacuum chamber 10 to a pump 23, which can be operated continuously or under timed control, in order to maintain a sufficient insulating vacuum in the vacuum chamber 10. In this case a complex coupling to the rotating vacuum chamber 10 is not required, the pump line 21 and the pump 23 are stationary.

Figure 2:
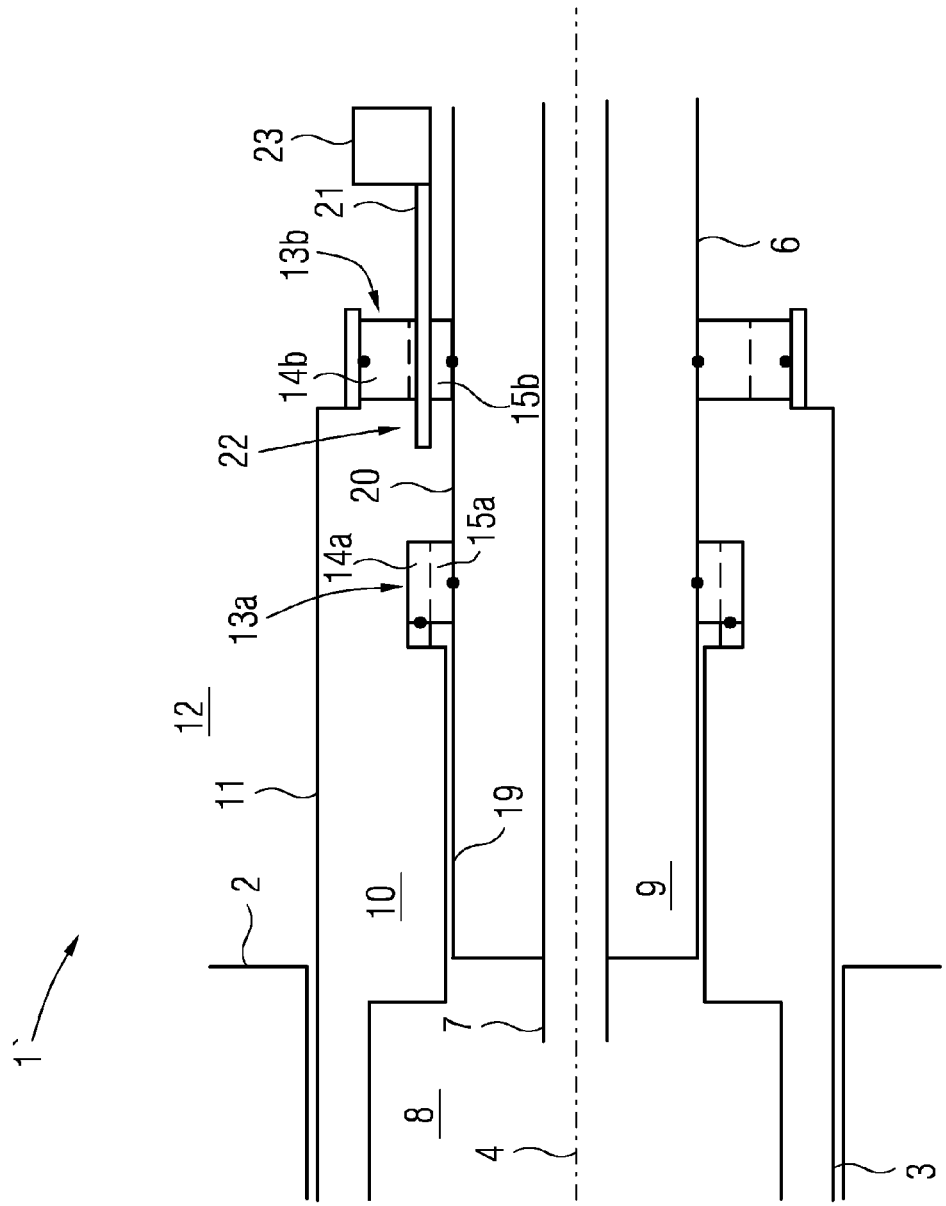
FIG. 2 shows relevant components of an inventive synchronous machine in a second embodiment.
Figure 3:
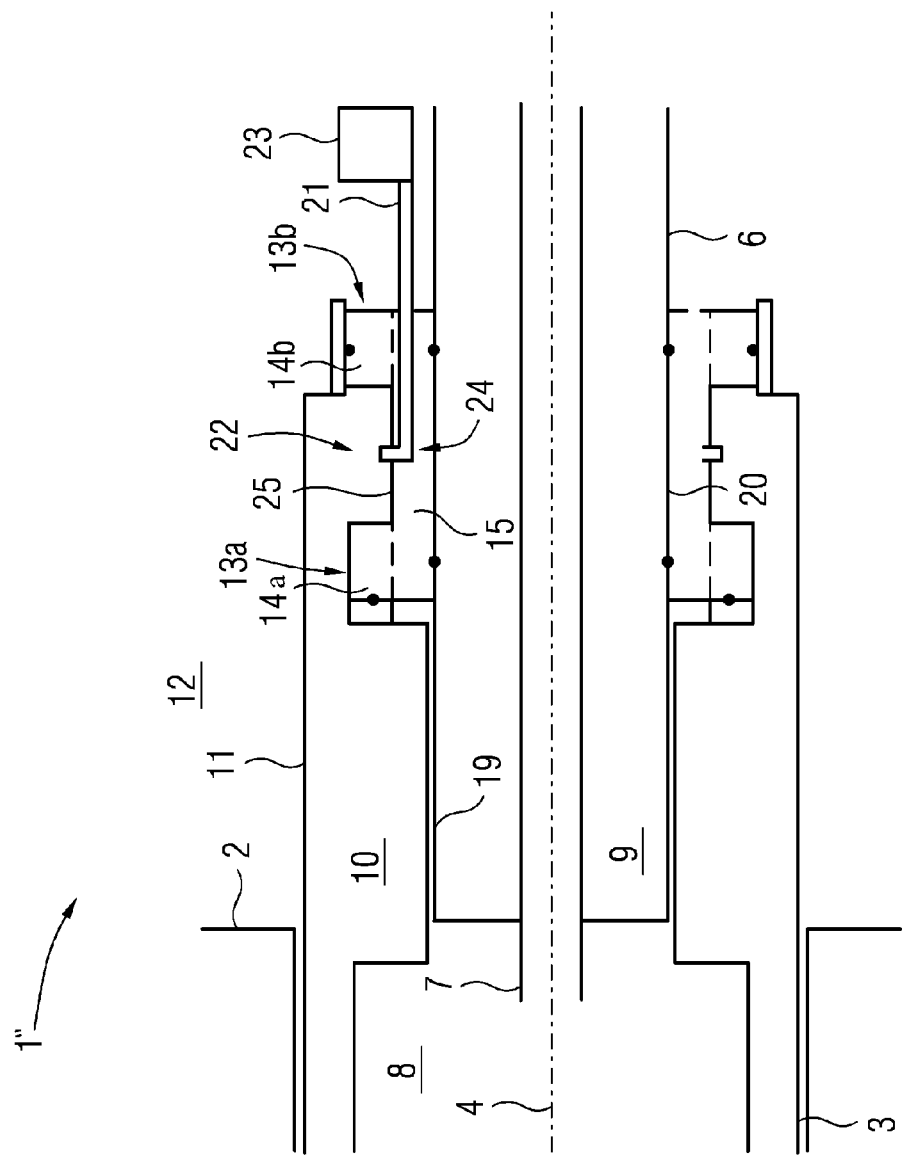
FIG. 3 shows relevant components of an inventive synchronous machine in a third embodiment and FIG. 4 shows relevant components of an inventive synchronous machine in a fourth embodiment.
Figure 4:
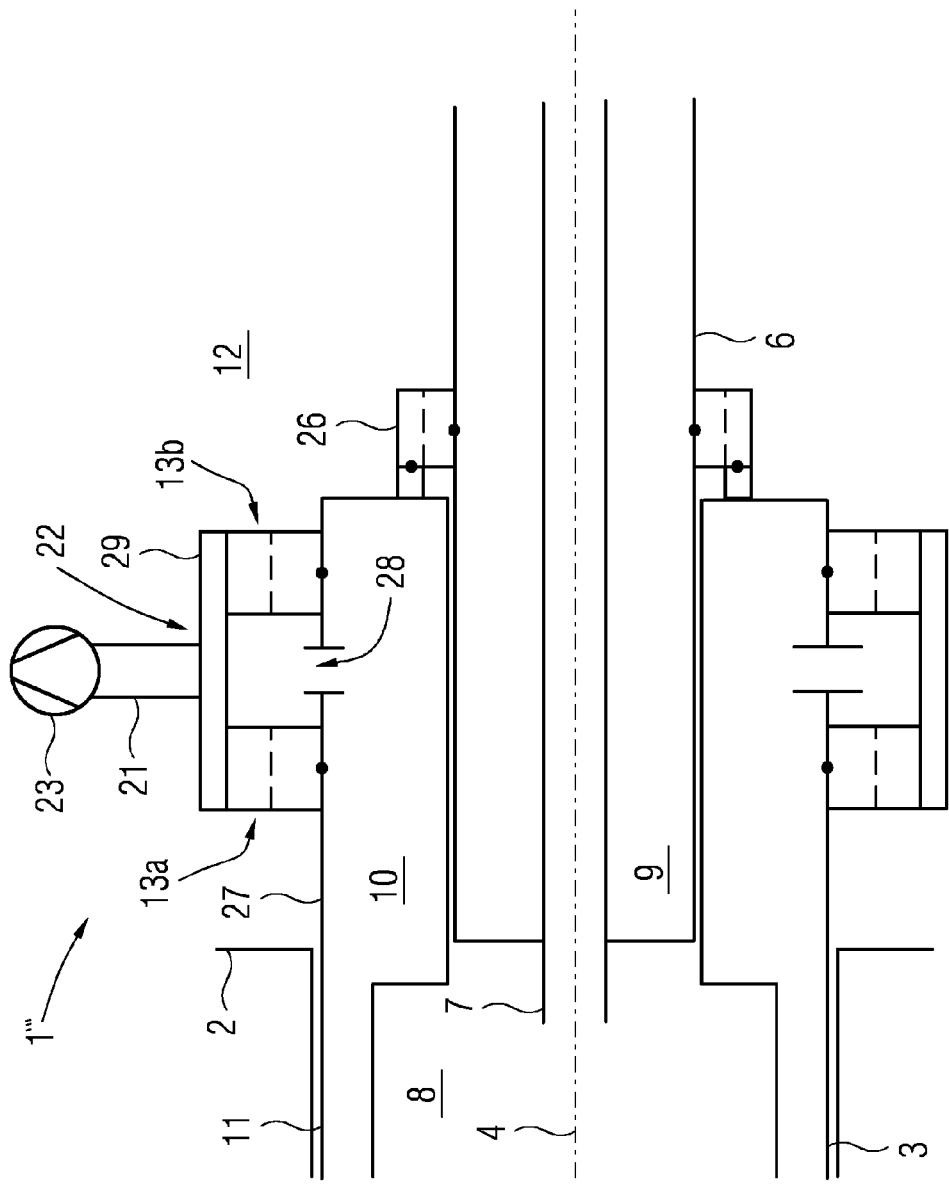

FIGS. 2 and 3 now show modified embodiments compared to FIG. 1 wherein, for the sake of simplicity, the same components are provided with the same reference characters here and also in relation to the third embodiment in accordance with FIG. 4 still to be discussed.

FIG. 2 shows a modified embodiment of the synchronous machine 1', in which the pump line 21 is not routed through the component 6, but through the fixed-location hollow cylinder 15b of the rotary seal 13b, which is modified accordingly. In this case only a change to the hollow cylinder 15b is thus required, the component 6 and especially the wall section 20 of the external wall 19 remain unchanged. This makes possible a simplified construction.

FIG. 3 shows a third embodiment of an inventive synchronous machine 1", in which the two rotary seals 13a, 13b as well as the pump line 21 are combined into a common constructional unit 24. In this case the hollow cylinder 15 attached to the external wall 19 of the component 6 is ultimately penetrated for both rotary seals 13a, 13b and, with a section 25, forms a delimitation of the vacuum chamber 10, thus of the connection area 22, wherein the section 25 lies between the hollow cylinders 14a and 14b. In this way the entire arrangement with the rotary seals 13a, 13b and the pump line 21 can be implemented as a single, common constructional unit 24.

FIG. 4 shows a further modified embodiment of an inventive synchronous machine 1'''. In this machine the connection area 22 is not provided on the component 6, the cooling trunk, which is routed through a normal rotary passthrough 26 unchanged compared to the prior art, but an arrangement with rotary seals 13a, 13b is provided on an external wall 27 of the rotor 3 outside the area of the stator 2, wherein the rotary seals 13a, 13b, which are still embodied as ferrofluid seals, are each disposed adjacent to an opening 28 in the external wall 27, so that the vacuum chamber 10 is expanded into the area of a static cover 29. The pump line 21 with the pump 23 now starts there.

In this case both rotary seals 13a, 13b thus seal against the outer space 12, which can be filled with air, wherein however, as already mentioned, the inventive synchronous machines 1, 1', 1", 1''' can be used especially advantageously in a hydrogen gas environment.

The invention claimed is:
1. A superconducting synchronous machine, comprising:
a rotor which rotates in relation to a stator which has a superconducting winding;
a cooling device which cools the superconducting winding,
wherein cooled areas of the rotor are surrounded at least partly by a vacuum chamber rotating with the rotor, and
wherein in a connection area created by means of at least two rotary seals, static in relation to the rotor and delimiting the vacuum chamber, a pump line connecting the vacuum chamber to a vacuum pump is provided,
wherein, as part of the cooling device, a static line section for a cooling medium is routed into the rotor, which static line section is surrounded by a component having a cylindrical external wall,
wherein a single constructional unit comprises the at least two axial seals such that a static portion of the constructional unit forms a continuous hollow cylinder attached to the cylindrical external wall and two further cylinders spaced apart from one another form rotary portions of the two axial seals,
wherein the static portion and the rotary portions of the constructional unit are coaxial and rotatable against one another,
wherein the axial consecutive rotary seals are arranged such that the static portion of the single constructional unit surrounding one of the two seals forms a delimitation of the vacuum chamber, and
wherein the pump line is routed through the static portion of the constructional unit.
2. The synchronous machine as claimed in claim 1, wherein the rotary seal is a ferrofluid seal.
3. The synchronous machine as claimed in claim 1, wherein the rotor is surrounded by a hydrogen gas intended for cooling the stator.
4. The synchronous machine as claimed in claim 1, wherein the cooling device using an inner space of the rotor as an evaporation chamber is provided.

* * * * *